United States Patent
Fang et al.

(10) Patent No.: US 10,172,154 B2
(45) Date of Patent: Jan. 1, 2019

(54) METHOD AND DEVICE FOR SENDING CONTROL INFORMATION AND METHOD AND DEVICE FOR RECEIVING CONTROL INFORMATION

(71) Applicant: ZTE Corporation, Shenzhen (CN)

(72) Inventors: Huiying Fang, Shenzhen (CN); Bo Dai, Shenzhen (CN); Shuqiang Xia, Shenzhen (CN); Jing Shi, Shenzhen (CN); Xincai Li, Shenzhen (CN); Shupeng Li, Shenzhen (CN)

(73) Assignee: XI'AN ZHONGXING NEW SOFTWARE CO., LTD., Xi'An (CN)

( * ) Notice: Subject to any disclaimer, the term of this patent is extended or adjusted under 35 U.S.C. 154(b) by 416 days.

(21) Appl. No.: 14/760,874

(22) PCT Filed: Nov. 19, 2013

(86) PCT No.: PCT/CN2013/087427
§ 371 (c)(1),
(2) Date: Jul. 14, 2015

(87) PCT Pub. No.: WO2014/107994
PCT Pub. Date: Jul. 17, 2014

(65) Prior Publication Data
US 2015/0358996 A1 Dec. 10, 2015

(30) Foreign Application Priority Data
Jan. 14, 2013 (CN) .......................... 2013 1 0012980

(51) Int. Cl.
*H04W 72/12* (2009.01)
*H04L 5/14* (2006.01)
(Continued)

(52) U.S. Cl.
CPC ....... *H04W 72/1278* (2013.01); *H04L 1/0088* (2013.01); *H04L 1/08* (2013.01);
(Continued)

(58) Field of Classification Search
CPC ............ H04L 1/08; H04L 5/14; H04W 4/005; H04W 72/0406; H04W 72/1278
See application file for complete search history.

(56) References Cited

U.S. PATENT DOCUMENTS 8,599,770 B2 * 12/2013 Jang .................. H04W 72/1257
370/329
2014/0146690 A1 * 5/2014 Gupta ................... H04W 4/005
370/252

FOREIGN PATENT DOCUMENTS

CN 101232737 A 7/2008
CN 101272595 A 9/2008
(Continued)

OTHER PUBLICATIONS

International Search Report for corresponding application PCT/CN2013/087427 filed Nov. 19, 2013; dated Feb. 27, 2014.
(Continued)

*Primary Examiner* — Rebecca E Song
*Assistant Examiner* — Nourali Mansoury
(74) *Attorney, Agent, or Firm* — Cantor Colburn LLP

(57) ABSTRACT

Provided are a method and device for sending control information and receiving control information. The method for sending control information comprises repeatedly sending control information within a scheduling period of the control information M times, wherein the scheduling period is the length of N radio frames, N and M are positive integers greater than 1, and N is greater than or equal to M. The disclosure solves the technical problem in the related art that control information cannot be correctly received in a low- (Continued)

coverage environment and thus a terminal cannot normally access a network, achieving the technical effect of accurately receiving the control information so as to ensure that the network can be accessed normally.

14 Claims, 11 Drawing Sheets

(51) Int. Cl.
*H04W 72/04* (2009.01)
*H04W 48/10* (2009.01)
*H04L 1/00* (2006.01)
*H04L 1/08* (2006.01)
*H04W 4/70* (2018.01)
*H04W 48/12* (2009.01)
*H04W 68/00* (2009.01)

(52) U.S. Cl.
CPC ............... *H04L 5/14* (2013.01); *H04W 48/10* (2013.01); *H04W 72/0406* (2013.01); *H04W 4/70* (2018.02); *H04W 48/12* (2013.01); *H04W 68/005* (2013.01)

(56) References Cited

FOREIGN PATENT DOCUMENTS

| | | |
|---|---|---|
| CN | 101610098 A | 12/2009 |
| EP | 1909523 A1 | 4/2008 |

OTHER PUBLICATIONS

"[66#9] LTE-UMTS: Inbound mobility to CSG cell from LTE cell" UE3GPP TSG RAN RAN WG2#66bis, Los Angeles, USA; Jun. 29-Jul. 3, 2009; R2-093920; XP50353113A; pp. 30.

"Draft CR to TS 25.331—Introduction of UTRAN to E-TURN Interworking" 3GPP TSG RAN2#61; R2-081052; XP50603592A; Sorrento, Italy, Feb. 11-15, 2008; pp. 1165.

"Interference Coordianation for DCL CCH Considering Legacy" UE3GPP TSG RAN WG1 meeting #60bis; R1-101783; XP50419191A; Beijing, China Apr. 12-16, 2010; pp. 6.

* cited by examiner

METHOD AND DEVICE FOR SENDING CONTROL INFORMATION AND METHOD AND DEVICE FOR RECEIVING CONTROL INFORMATION

TECHNICAL FIELD

The disclosure relates to the field of communications, and specifically, to a method and device for sending control information and a method and device for receiving control information.

BACKGROUND

A machine type communication (referred to as MTC) user equipment (referred to as MTC UE), which is also called as an M2M user communication apparatus, and is a main application mode of an Internet of things at the current stage. MTC users enjoy the advantages of low cost and low power consumption, and these advantages provide important guarantee for the large scale application thereof. A smart metering type apparatus is one of the typical applications of the MTC apparatus. Most of the smart metering type MTC apparatuses are fixedly arranged in a low-coverage performance environment, such as a basement; and in order to ensure that normal communication can be maintained between this type of MTC apparatuses and a NodeB system, it is often necessary to deploy an apparatus, such as an extra station and a relay, which will no doubt increase the deployment cost of the operator greatly. Therefore, companies, such as Vodafone propose to improve the coverage requirements of the smart metering type MTC apparatus on the premise of not increasing extra apparatus deployment in the technical proposal RP-121282 of a 3rd generation partnership project (referred to as 3 GPP) radio access network (referred to as RAN).

The smart metering type MTC apparatus mainly sends minipacket data, has a low requirement on a data rate, and can tolerate a greater data transmission delay. Since the smart metering type MTC apparatus has a pretty low requirement on the data rate, with regard to a data channel, the correct transmission of the minipacket data can be ensured by means of a lower modulation and coding rate and repeatedly sending on a time domain.

However, system information in an existing LTE system comprises: a main information block (referred to as MIB) and a plurality of system information blocks (referred to as SIBs). The sending process of the system information is shown in FIG. 1, i.e. a NodeB sends the above-mentioned main system information block and system information blocks (such as: SIB1, SIB2 . . . SIBs) to a terminal. With regard to the MTC terminal apparatus in a low-coverage environment, in main system information used for a legacy terminal, other information apart from system frame number (referred to SFN) information is unnecessary, and it is necessary to perform performance optimization for the sending of the main system information. With regard to the system information blocks (SIBs), other system information blocks (SIB2, SIB3, . . . ) apart from SIB1 are all sent by a system information (referred to as SI) message configured by a scheduling information list in the SIB1. As shown in FIG. 2, SIB1 is a fixed scheduling period of 80 ms, the SIB1 is repeatedly sent four times on a sub-frame 5 of a radio frame with an even sequence number in 80 ms. The smart metering type MTC apparatus deployed in the low-coverage environment can tolerate a greater time delay, therefore with regard to control signalling such as resource configuration and data transmission, the transmission performance can be ensured by scheduling enough times of repeated transmission on the time domain. However, with regard to a corresponding SIB1, the sending times in the scheduling period is limited, and thus this type of MTC terminals can not correctly receive the SIB1 so that all the system information blocks can not be received, ultimately causing the terminal to be difficult to normally access a network.

The above are merely taking an MTC terminal as an example for illustration, in the low-coverage environment, a legacy terminal apparatus aside from the above-mentioned MTC terminal also has the problem of not being able to correctly receive the SIB1, which can also cause the terminal not to be able to normally access a network.

In the low-coverage environment, the urgent problem to be solved is how to improving the coverage performance of a terminal apparatus without increasing extra delay apparatus deployment so that a terminal is able to correctly receive system information blocks (SIBs) so as to ensure that communication between the terminal apparatus and a NodeB system can be normally maintained.

With regard to the above-mentioned problem, no effective solution has been presented.

SUMMARY

Embodiments of the disclosure provides a method and device for sending control information and receiving control information, so as to at least solve the problem that control information cannot be correctly received in a low-coverage environment and thus a terminal cannot normally access a network.

According to one aspect of the embodiments of the disclosure, a method for sending control information is provided, which comprises: repeatedly sending the control information within a scheduling period of the control information M times, wherein the scheduling period is the length of N radio frames, N and M are positive integers greater than 1, and N is greater than or equal to M.

Preferably, the N is the nth power of 2, the M is the mth power of 2, wherein n is a positive integer greater than or equal to 5, and m is a positive integer greater than or equal to 3.

Preferably, repeatedly sending the control information M times comprises: sending the control information once on resources for sending the control information pre-defined in the length of N radio frames at a pre-set time interval; or equally dividing the length of N radio frames into M periods, and sending the control information once on the pre-defined resources for sending the control information of the each period.

Preferably, a system frame number of a radio frame where the pre-defined resources for sending the control information are located is determined according to at least one of the followings: a pre-set time interval, a cell identifier and indication signalling.

Preferably, in the case of the system frame number of the radio frame meets a pre-defined condition, the system frame number is the determined system frame number of the radio frame where the pre-defined resources for sending the control information are located, wherein the pre-defined condition comprises one of the followings: the system frame number % Y=D; (the system frame number+the cell identifier) % Y=D; (the system frame number+X) % Y=D; and (the system frame number+X+the cell identifier) % Y=D, where % indicates a modulo operation, the pre-set time interval is the length of Y radio frames, wherein Y=N/M, and X is a positive integer determined according to the indication signalling, and D is a natural number pre-defined or determined according to the cell identifier.

Preferably, a corresponding system frame number h of, in the N radio frames, the control information being transmitted in the N radio frames for the kth time is determined according to one of the following formulas, wherein k is a positive integer less than or equal to M, and h is a positive integer less than or equal to N:

$$h = \left\lceil \frac{k \times N}{M} \right\rceil \% N; h = \left( \left\lceil \frac{k \times N}{M} \right\rceil + T \right) \% N:$$

where % indicates a modulo operation, ⌈ ⌉ indicates a round-up operation, and T is at least one of the followings: a pre-defined value, a cell identifier and a signalling indication value.

Preferably, the control information comprises: system information and/or paging information.

Preferably, when the control information is the system information, in a frequency division duplex (referred to as FDD) system, the system information comprises at least one of the followings: access channel configuration information, uplink bandwidth information and uplink carrier frequency information; and in a time division duplex (referred to as TDD) system, the system information comprises at least one of the followings: access channel configuration information, uplink bandwidth information and uplink to downlink ratio information.

Preferably, pre-defined resources for sending the control information of the system information and pre-defined resources for sending the control information of the paging information are located in different radio frames, or the pre-defined resources for sending the control information of the system information and the pre-defined resources for sending the control information of the paging information are located in different sub-frames in the same radio frame.

Preferably, when the pre-defined resources for sending the control information of the system information and the pre-defined resources for sending the control information of the paging information are located in different sub-frames in the same radio frame, the system information and/or the paging information is sent on a sub-frame with a sub-frame number being at least one of the followings: 5, 6, 7, 8 and 9.

Preferably, the pre-defined resources for sending the control information occupies Q orthogonal frequency division multiplexing (referred to as OFDM) symbols on a time domain and occupies S sub-carriers on a frequency domain, or the pre-defined resources for sending the control information occupies P resource blocks, wherein Q, S and P are positive integers.

Preferably, the value of Q is any one of 2, 3 and 4, and S is 36 or 72.

According to one aspect of the embodiments of the disclosure, a method for receiving control information is provided, which comprises: a terminal repeatedly receiving the control information within a scheduling period which is the length of N radio frames M times, wherein N and M are positive integers greater than 1, and N is greater than or equal to M; and the terminal combining and decoding the received M times of control information to determine the control information.

Preferably, the step of a terminal repeatedly receiving the control information within a scheduling period which is the length of N radio frames M times comprises: the terminal determining a system frame number of a radio frame where a pre-defined resources for sending the control information is located, and the scheduling period containing the M pre-defined resources for sending the control information; and the terminal detecting a signal on the radio frame corresponding to the determined system frame number to acquire the control information.

Preferably, a location of the pre-defined resources for sending the control information is fixed, and a size of the pre-defined resources for sending the control information is determined according to a size of a resource required by maximum control information.

Preferably, the step of the terminal determining the system frame number of the radio frame where the control information is located comprises: the terminal determining the system frame number of the radio frame where the control information is located according to at least one of the followings: a pre-set time interval, a cell identifier and indication signalling, wherein the cell identifier is acquired by way of the terminal demodulating a downlink synchronous channel.

Preferably, in the case of the system frame number of the radio frame meets a pre-defined condition, the system frame number is the determined system frame number of the radio frame where the pre-defined resources for sending the control information is located, wherein the pre-defined condition comprises one of the followings: the system frame number % Y=D; (the system frame number+the cell identifier) % Y=D; (the system frame number+X) % Y=D; and (the system frame number+X+the cell identifier) % Y=D, where % indicates a modulo operation, the pre-set time interval is the length of Y radio frames, wherein Y=N/M, and X is a positive integer determined according to the indication signalling, and D is a natural number pre-defined or determined according to the cell identifier.

Preferably, a corresponding system frame number h of, in the N radio frames, the control information being transmitted in the N radio frames for the kth time is determined according to one of the following formulas, wherein k is a positive integer less than or equal to M, and h is a positive integer less than or equal to N:

$$h = \left\lceil \frac{k \times N}{M} \right\rceil \% N; h = \left( \left\lceil \frac{k \times N}{M} \right\rceil + T \right) \% N:$$

where % indicates a modulo operation, ⌈ ⌉ indicates a round-up operation, and T is at least one of the followings: a pre-defined value, a cell identifier and a signalling indication value.

Preferably, when the control information is the system information, in a frequency division duplex (FDD) system, the system information comprises at least one of the followings: access channel configuration information, uplink bandwidth information and uplink carrier frequency information; and in a time division duplex (TDD) system, the system information comprises at least one of the followings: access channel configuration information, uplink bandwidth information and uplink to downlink ratio information.

Preferably, pre-defined resources for sending the control information of the system information and pre-defined resources for sending the control information of the paging information are located in different radio frames, or the pre-defined resources for sending the control information of the system information and the pre-defined resources for sending the control information of the paging information are located in different sub-frames in the same radio frame.

Preferably, when the pre-defined resources for sending the control information of the system information and the pre-defined resources for sending the control information of the paging information are located in different sub-frames in the same radio frame, the system information and/or the paging information is sent on a sub-frame with a sub-frame number being at least one of the followings: 5, 6, 7, 8 and 9.

Preferably, the pre-defined resources for sending the control information occupies Q orthogonal frequency division multiplexing (OFDM) symbols on a time domain and occupies S sub-carriers on a frequency domain, or the pre-defined resources for sending the control information occupies P resource blocks, wherein Q, S and P are positive integers.

Preferably, the value of Q is any one of 2, 3 and 4, and S is 36 or 72.

Preferably, after the terminal combines and decodes the received M times of control information to determine the control information, the above-mentioned method further comprises: the terminal initiating an access request according to the obtained control information.

According to another aspect of the embodiments of the disclosure, a device for sending control information is provided, which comprises: a sending element, configured to repeatedly send the control information within a scheduling period of the control information M times, wherein the scheduling period is the length of N radio frames, N and M are positive integers greater than 1, and N is greater than or equal to M.

Preferably, the sending element comprises: a first sending component, configured to send the control information once on a resources for sending the control information pre-defined in the length of N radio frames at a pre-set time interval; or a second sending component, configured to equally divide the length of N radio frames into M periods, and send the control information once on the pre-defined resources for sending the control information of the each period.

Preferably, the sending element determines a system frame number of a radio frame where the pre-defined resources for sending the control information is located according to at least one of the followings: a pre-set time interval, a cell identifier and indication signalling.

Preferably, in the case of the system frame number of the radio frame meets a pre-defined condition, the system frame number is the system frame number of, determined by the sending element, the radio frame where the pre-defined resources for sending the control information is located, wherein the pre-defined condition comprises one of the followings: the system frame number % Y=D; (the system frame number+the cell identifier) % Y=D; (the system frame number+X) % Y=D; and (the system frame number+X+the cell identifier) % Y=D, where % indicates a modulo operation, the pre-set time interval is the length of Y radio frames, wherein Y=N/M, and X is a positive integer determined according to the indication signalling, and D is a natural number pre-defined or determined according to the cell identifier.

Preferably, the sending element determines a corresponding system frame number h of, in the N radio frames, the control information being transmitted in the N radio frames for the kth time according to one of the following formulas, wherein k is a positive integer less than or equal to M, and h is a positive integer less than or equal to N:

$$h = \left\lceil \frac{k \times N}{M} \right\rceil \% N; h = \left( \left\lceil \frac{k \times N}{M} \right\rceil + T \right) \% N;$$

where % indicates a modulo operation, $\lceil \ \rceil$ indicates a round-up operation, and T is at least one of the followings: a pre-defined value, a cell identifier and a signalling indication value.

Preferably, the control information comprises: system information and/or paging information.

Preferably, when the control information is the system information, in a frequency division duplex (FDD) system, the system information comprises at least one of the followings: access channel configuration information, uplink bandwidth information and uplink carrier frequency information; and in a time division duplex (TDD) system, the system information comprises at least one of the followings: access channel configuration information, uplink bandwidth information and uplink to downlink ratio information.

Preferably, pre-defined resources for sending the control information of the system information and pre-defined resources for sending the control information of the paging information are located in different radio frames, or the pre-defined resources for sending the control information of the system information and the pre-defined resources for sending the control information of the paging information are located in different sub-frames in the same radio frame.

Preferably, when the pre-defined resources for sending the control information of the system information and the pre-defined resources for sending the control information of the paging information are located in different sub-frames in the same radio frame, the system information and/or the paging information is sent on a sub-frame with a sub-frame number being at least one of the followings: 5, 6, 7, 8 and 9.

Preferably, the pre-defined resources for sending the control information occupies Q orthogonal frequency division multiplexing (OFDM) symbols on a time domain and occupies S sub-carriers on a frequency domain, or the pre-defined resources for sending the control information occupies P resource blocks, wherein Q, S and P are positive integers.

Preferably, the value of Q is any one of 2, 3 and 4, and S is 36 or 72.

According to one aspect of the embodiments of the disclosure, a device for receiving control information is provided, located in a terminal, which comprises: a receiving element, configures to repeatedly receive the control information within a scheduling period which is the length of N radio frames M times, wherein N and M are positive integers greater than 1, and N is greater than or equal to M; and a decoding element, configured to combine and decode the received M times of control information to determine the control information.

Preferably, the receiving element comprises: a determination component, configured to determines a system frame number of a radio frame where a pre-defined resources for sending the control information is located, the scheduling period containing the M pre-defined resources for sending the control information; and an acquisition component, configured to detect a signal on the radio frame corresponding to the determined system frame number of the radio frame to acquire the control information.

Preferably, a location of the pre-defined resources for sending the control information is fixed, and a size of the pre-defined resources for sending the control information is determined according to a size of a resource required by maximum control information.

Preferably, the determination component is configured to determine the system frame number of the radio frame where the control information is located according to at least one of the followings: a pre-set time interval, a cell identifier and indication signalling, wherein the cell identifier is acquired by way of the terminal demodulating a downlink synchronous channel, and the system frame number is acquired by way of the terminal demodulating an enhanced broadcast channel.

Preferably, in the case of the system frame number of the radio frame meets a pre-defined condition, the system frame number is the system frame number of, determined by the determining component, the radio frame where the pre-defined resources for sending the control information is located, wherein the pre-defined condition comprises one of the followings: the system frame number % Y=D; (the system frame number+the cell identifier) % Y=D; (the system frame number+X) % Y=D; and (the system frame number+X+the cell identifier) % Y=D, where % indicates a modulo operation, the pre-set time interval is the length of Y radio frames, wherein Y=N/M, and X is a positive integer determined according to the indication signalling, and D is a natural number pre-defined or determined according to the cell identifier.

Preferably, the determination component determines a corresponding system frame number h of, in the N radio frames, the control information being transmitted in the N radio frames for the kth time according to one of the following formulas, wherein k is a positive integer less than or equal to M, and h is a positive integer less than or equal to N:

$$h = \left\lceil \frac{k \times N}{M} \right\rceil \%N; h = \left( \left\lceil \frac{k \times N}{M} \right\rceil + T \right) \%N,$$

where % indicates a modulo operation, ⌈ ⌉ indicates a round-up operation, and T is at least one of the followings: a pre-defined value, a cell identifier and a signalling indication value.

Preferably, the control information comprises: system information and/or paging information.

Preferably, when the control information is the system information, in a frequency division duplex (FDD) system, the system information comprises at least one of the followings: access channel configuration information, uplink bandwidth information and uplink carrier frequency information; and in a time division duplex (TDD) system, the system information comprises at least one of the followings: access channel configuration information, uplink bandwidth information and uplink to downlink ratio information.

Preferably, pre-defined resources for sending the control information of the system information and pre-defined resources for sending the control information of the paging information are located in different radio frames, or the pre-defined resources for sending the control information of the system information and the pre-defined resources for sending the control information of the paging information are located in different sub-frames in the same radio frame.

Preferably, when the pre-defined resources for sending the control information of the system information and the pre-defined resources for sending the control information of the paging information are located in different sub-frames in the same radio frame, the system information and/or the paging information is sent on a sub-frame with a sub-frame number being at least one of the followings: 5, 6, 7, 8 and 9.

Preferably, the pre-defined resources for sending the control information occupies Q orthogonal frequency division multiplexing (OFDM) symbols on a time domain and occupies S sub-carriers on a frequency domain, or the pre-defined resources for sending the control information occupies P resource blocks, wherein Q, S and P are positive integers.

Preferably, the value of Q is any one of 2, 3 and 4, and S is 36 or 72.

Preferably, the above-mentioned device further comprises: an access element, configures to initiate, after combining and decoding the received M times of control information to determine the control information, an access request according to the obtained control information.

In the embodiments of the disclosure, since a terminal deployed in a low-coverage environment is not sensitive to a time delay, and can tolerate a greater access delay and data transmission time delay, repeated sending times of a control message are ensured by prolonging the length of a scheduling period so as to solve the technical problem in the related art that control information cannot be correctly received in a low-coverage environment and thus a terminal cannot normally access a network, achieving the technical effect of accurately receiving the control information so as to ensure that the network can be accessed normally.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the drawings and embodiments in detail. It should be noted that the embodiments of the present application and the characteristics of the embodiments may be combined with each other if there is no conflict.

Figure 1:
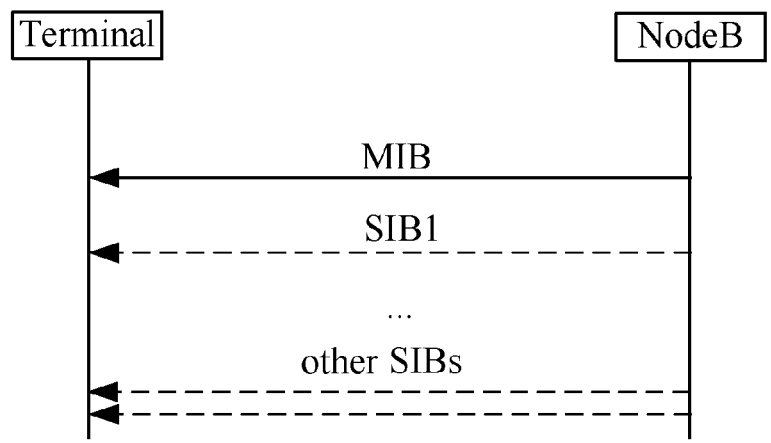
FIG. 1 is a flowchart of sending system information in an LTE system according to the related art.
Figure 2:
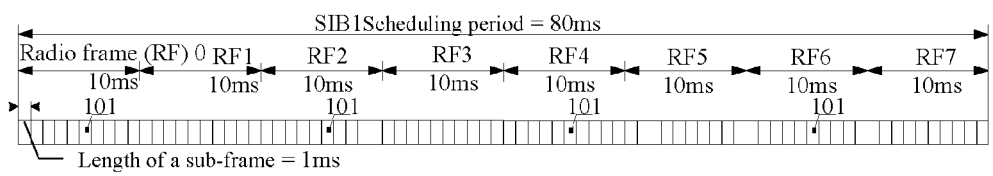
FIG. 2 is a flowchart of scheduling an SIB1 message in an LTE system according to the related art.
Figure 3:
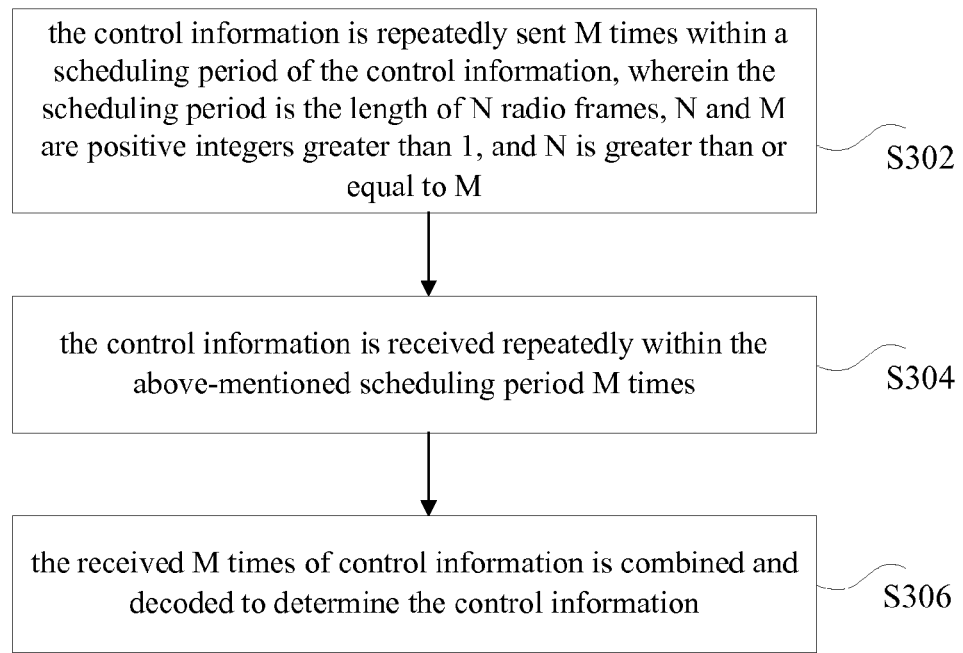
FIG. 3 is a preferred flowchart of a method for sending control information according to an embodiment of the disclosure.

An embodiment of the disclosure provides a method for sending control information; and as shown in FIG. 3, the method comprises the following steps:

Step S302: repeatedly sending the control information within a scheduling period of the control information M times, wherein the scheduling period is the length of N radio frames, N and M are positive integers greater than 1, and N is greater than or equal to M;

Step S304: repeatedly receiving the control information within the above-mentioned scheduling period M times; and Step S306: combining and decoding the received M times of control information to determine the control information.

In the above-mentioned preferred implementation, since a terminal deployed in a low-coverage environment is not sensitive to a time delay, and may tolerate a greater access delay and data transmission time delay, repeated sending times of a control message are ensured by prolonging the length of a scheduling period so as to solve the technical problem in the related art that control information cannot be correctly received in a low-coverage environment and thus a terminal cannot normally access a network, achieving the technical effect of accurately receiving the control information so as to ensure that the network can be accessed normally.

The values of N and M mentioned above can both be an exponential power of 2, for example, N is the nth power of 2, and M is the mth power of 2; and preferably, n may be a positive integer greater than or equal to 5, and m may be a positive integer greater than or equal to 3, for example, N may be one of 32, 64, 128, 256, 512 or 1024.

Within a scheduling period, the same control information may be sent on a location corresponding to the pre-defined resources for sending the control information by taking a fixed time interval L or fixed k radio frames as a period. That is to say, the control information may be repeatedly sent M times by the following ways:

1) sending the control information once on pre-defined resources for sending the control information in the length of N radio frames at a pre-set time interval, i.e. time intervals of sending the control information each time and next time or last time are the same; or 2) equally dividing the length of N radio frames into M periods, and sending the control information once on the pre-defined resources for sending the control information in each of M periods, i.e. firstly dividing the scheduling period into a plurality of small periods, then sending the control information once on each small periods, time intervals of sending the control information each time and next time or last time being able to be different, as long as it is ensured that sending the control information once on each small period. For example, the fixed period may be k radio frames, positions of the radio frames is indicated via k-bit signalling, or a period and an initial location are indicated via signalling, including the sub-frame location, or the radio frame is taken as a unit and the sub-frame is pre-defined, or the fixed period is k radio frames, transmission is performed in pre-defined M radio frames in the k radio frames, for example, the control information may be sent in the first h radio frames or the last h radio frames or at an interval of h radio frames in the k radio frames.

If the resources for sending the control information needs to be determined, it is necessary to determine the location of the resources for sending the control information so as to finally determine the time point of sending the control information; and the so-called determining the location of the resources for sending the control information may be determining a system frame number of the radio frame where the resources for sending the control information is located. In a preferred implementation, the system frame number of the radio frame where the pre-defined resources for sending the control information are located may be determined according to at least one of the followings: a pre-set time interval, a cell identifier and indication signalling. For a better illustration, the present embodiment further provides several specific calculation methods; and a frame number of the resources for sending the control information in N radio frames is:

1) the system frame number % Y=D;
2) (the system frame number+the cell identifier) % Y=D;
3) (the system frame number+X) % Y=D; or
4) (the system frame number+X+the cell identifier) % Y=D, where % indicates a modulo operation, the pre-set time interval is the length of Y radio frames, wherein Y=N/M, and X may be a positive integer determined according to the indication signalling, and D may be a pre-defined natural number or may be a natural number determined according to the cell identifier.

Preferably, a terminal and a device on the network side may determine a corresponding system frame number h of, in the N radio frames, the control information being transmitted in the N radio frames for the kth time according to one of the following formulas, wherein k is a positive integer less than or equal to M, and h is a positive integer less than or equal to N:

$$h = \left\lceil \frac{k \times Z}{M} \right\rceil \% Y; \text{ and}$$

$$h = \left(\left\lceil \frac{k \times N}{M} \right\rceil + T\right) \% N,$$

where % indicates a modulo operation, ⌈ ⌉ indicates a round-up operation, and T is at least one of the followings: a pre-defined value, a cell identifier and a signalling indication value.

In the above-mentioned various preferred implementations, the control information comprises: system information and/or paging information.

When the control information is the system information, in a frequency division duplex (FDD) system, the system information may comprise but not limited to at least one of the followings: access channel configuration information, uplink bandwidth information and uplink carrier frequency information; and in a time division duplex (TDD) system, the system information may comprise but not limited to at least one of the followings: access channel configuration information, uplink bandwidth information and uplink to downlink ratio information.

In order to distinguish whether the control information is system information or paging information, the system information and the paging information may be set to be sent at different locations, for example, pre-defined resources for sending the control information corresponding to the system information and pre-defined resources for sending the control information corresponding to the paging information may be located in different radio frames, or the pre-defined resources for sending the control information corresponding to the system information and the pre-defined resources for sending the control information corresponding to the paging information may be located in different sub-frames in the same radio frame. That is to say, the system information and the paging information may be transmitted via different radio frames and may also be transmitted via different sub-frames in the same radio frame.

Preferably, when the pre-defined resources for sending the control information corresponding to the system information and the pre-defined resources for sending the control information corresponding to the paging information are located in different sub-frames in the same radio frame, sending may be performed by using at least one of the following sub-frame: a sub-frame with sub-frame number 5, a sub-frame with sub-frame number 6, a sub-frame with sub-frame number 7, a sub-frame with sub-frame number 8 and a sub-frame with sub-frame number 9.

The pre-defined resources for sending the control information needs to occupy a certain resource, and it may be set to occupy Q orthogonal frequency division multiplexing (OFDM) symbols on a time domain and occupy S sub-carriers on a frequency domain, or the pre-defined resources for sending the control information occupies P resource blocks, wherein Q, S and P are positive integers. Preferably, the value of Q mentioned above may be any one of 2, 3 and 4, and S may be 36 or 72.

The above-mentioned step S304 may specifically comprises: in the scheduling period, detecting a signal on the pre-defined resources for sending the control information, wherein the scheduling period contains M pre-defined resources for sending the control information; and in the case where the control information is detected, acquiring the detected control information. Since there are M pre-defined resources for sending the control information, M times of control information may be acquired by detecting each pre-defined resources for sending the control information.

Preferably, locations of the above-mentioned pre-defined resources for sending the control information is fixed, and sizes of the above-mentioned pre-defined resources for sending the control information may be determined according to a size of a resource required by maximum control information, i.e. the pre-defined resources for sending the control information needs to contain the maximum control information.

Figure 4:
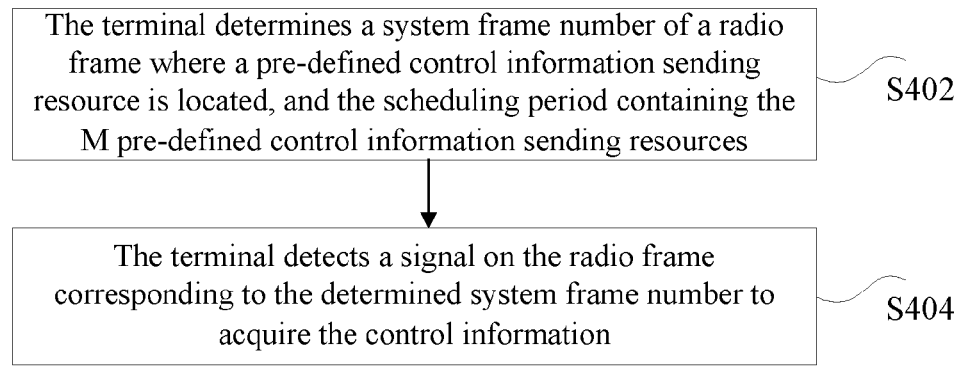
FIG. 4 is another preferred flowchart of a method for sending control information according to an embodiment of the disclosure.

As shown in FIG. 4, the above-mentioned step S304 may specifically further comprises:

Step S402, the terminal determining a system frame number of a radio frame where pre-defined resources for sending the control information are located, and there are M pre-defined resources for sending the control information in the scheduling period; and Step S404, the terminal detecting a signal on the radio frame corresponding to the determined system frame number to acquire the control information.

Preferably, when the terminal determines the system frame number of the radio frame where the control information is located, a cell identifier may be acquired by way of the terminal demodulating a downlink synchronous channel, and the system frame number may be acquired by way of the terminal demodulating an enhanced broadcast channel.

In a preferred implementation, after combining and decoding the received M times of control information to determine the control information, the above-mentioned method further comprises: the terminal initiating an access request according to the obtained control information.

Figure 5:
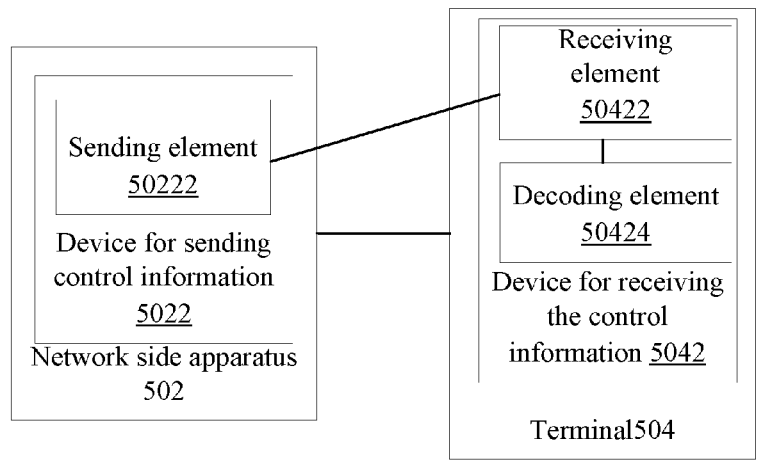
FIG. 5 is a preferred structure block diagram of a system for sending control information according to an embodiment of the disclosure.

The present embodiment also provides a system for sending control information, the device is configured to implement the above-mentioned embodiment and the preferred implementation; and with regard to the part that has been described, no further description is needed. As used in the followings, terms "unit" or "component" can achieve a combination of software and/or hardware with predetermined functions. Although the device described by the following embodiments is preferably implemented by the software, it may also be contemplated to be implemented by the hardware or the combination of the software and the hardware. FIG. 5 is a preferred structure block diagram of a system for sending control information according to an embodiment of the disclosure; and as shown in FIG. 5, the system comprises: network side apparatus 502 and a terminal 504, wherein the network side apparatus comprises a device 5022 for sending control information, and the terminal comprises a device 5042 for receiving the control information.

As shown in FIG. 5, a sending element 50222 is provided in the device 5022 for sending the control information, and is configured to repeatedly send the control information within a scheduling period of the control information M times, wherein the scheduling period is the length of N radio frames, N and M are positive integers greater than 1, and N is greater than or equal to M.

A receiving element 50422 is provided in the device 5042 for receiving the control information, is coupled with the sending element 50222, and is configured to repeatedly receive the control information within a scheduling period which is the length of N radio frames M times, wherein N and M are positive integers greater than 1, and N is greater than or equal to M; and a decoding element 50424 is coupled with the receiving element 50422, and is configured to combine and decode the received M times of control information to determine the control information.

Figure 6:
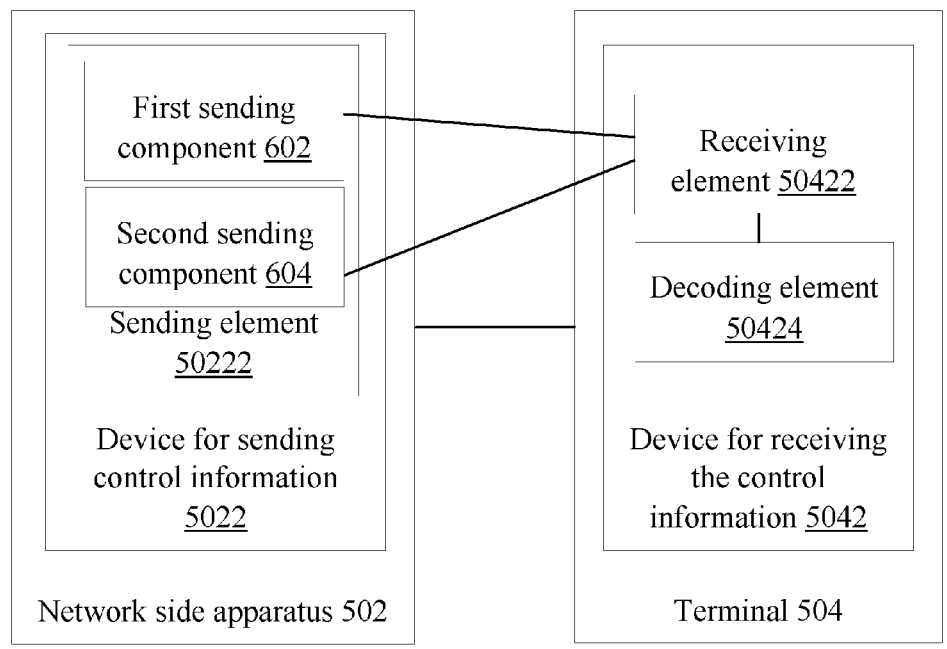
FIG. 6 is another preferred structure block diagram of a system for sending control information according to an embodiment of the disclosure.

In a preferred implementation, as shown in FIG. 6, the sending element may comprise: a first sending component 602, configured to send the control information once on a resources for sending the control information pre-defined in the length of N radio frames at a pre-set time interval; or a second sending component 604, configured to equally divide the length of N radio frames into M periods, and send the control information once on the pre-defined resources for sending the control information of the each period.

Figure 7:
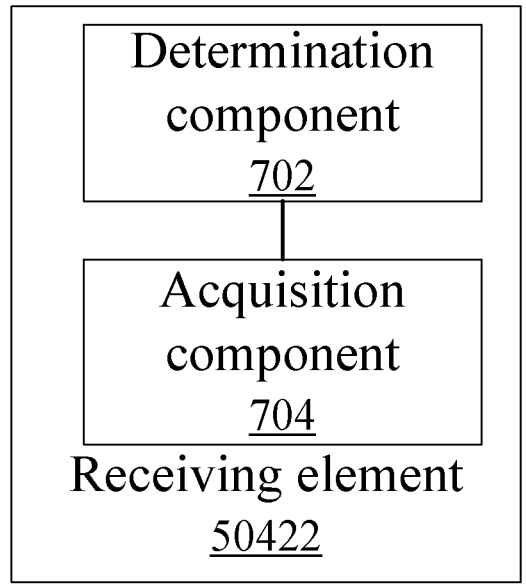
FIG. 7 is a preferred structure block diagram of a receiving element according to an embodiment of the disclosure.

In a preferred implementation, as shown in FIG. 7, the receiving element comprises: a determination component 702 configured to determine system frame numbers of radio frames where pre-defined resources for sending the control information are located, the scheduling period containing the M pre-defined resources for sending the control information; and an acquisition component 704, which is coupled with the determination component 702, configured to detect a signal on the radio frame corresponding to the determined system frame number of the radio frame to acquire the control information.

Figure 8:
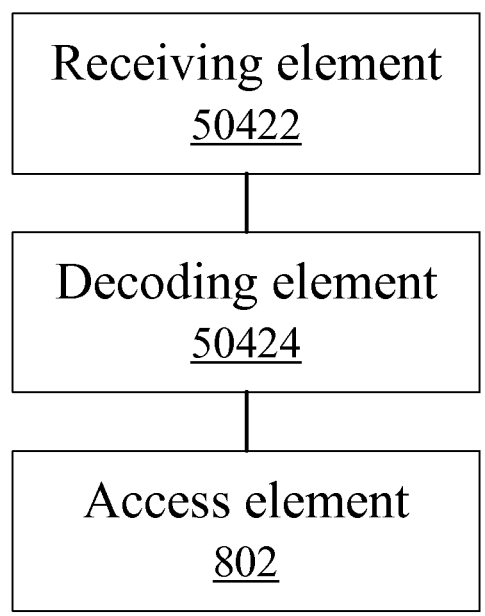
FIG. 8 is a preferred structure block diagram of a device for receiving control information according to an embodiment of the disclosure.

In a preferred implementation, as shown in FIG. 8, the above-mentioned terminal further comprises an access element 802, which is coupled with the decoding element 50424, configured to initiate, after combining and decoding the received M times of control information to determine the control information, an access request according to the control information determined after combining and decoding.

In the above-mentioned various preferred implementations, the above-mentioned terminal may be an MTC terminal, and can also be other terminals having the requirement of coverage enhancement.

The inventive concept of the embodiments of the disclosure is to ensure that a terminal in a low-coverage environment is able to correctly receive control information, such as system information so that the terminal in the low-coverage environment is able to correctly receive the control information so as to ensure normal communication requirement of the terminal. Since a fixed terminal deployed in a low-coverage environment is not sensitive to a time delay, and can tolerate a greater access delay and data transmission time delay, by using the method and device for sending control information provided by the embodiments of the disclosure, it can be ensured that the terminal is able to correctly receive control information on the premise of imposing no obvious impact on the sending of a legacy terminal service, so as to ensure such a terminal can normally access a network.

The embodiments of the disclosure further provides several preferred embodiments to further describe the disclosure; however, it is noted that the preferred embodiments are only for better illustration of the disclosure rather than to limit the disclosure.

Preferred Embodiment 1

Figure 9:
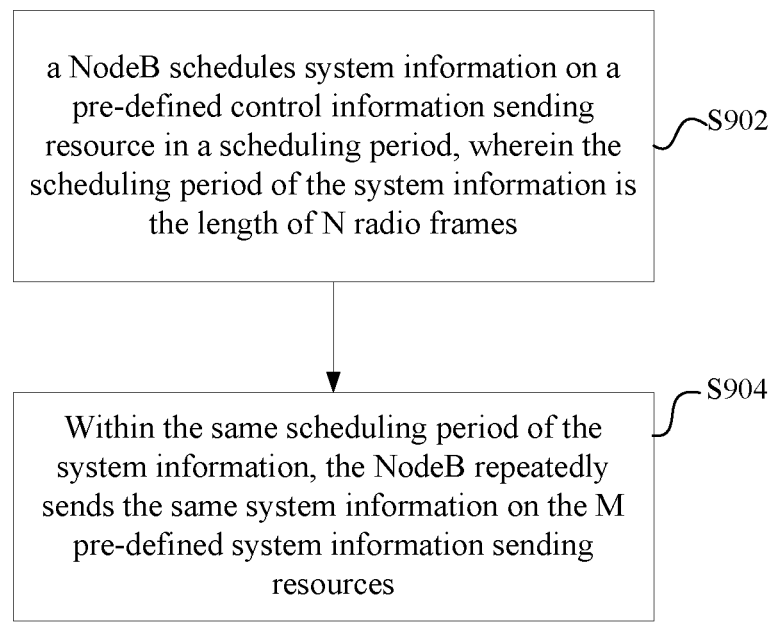
FIG. 9 is a preferred flowchart of the processing of a method for sending control information on a NodeB side according to an embodiment of the disclosure.

In the present preferred embodiment, sending system information via the method for sending control information provided above is taken as an example for detailed illustration. As shown in FIG. 9, specific processing steps on the NodeB side comprise:

Step S902: scheduling, by a NodeB, system information on pre-defined resources for sending the control information in a scheduling period, wherein the scheduling period of the system information is the length of N radio frames.

In a scheduling period with a length being the length of N radio frames, there are M pre-defined resources for sending the system information; and the M pre-defined resources for sending the system information maintains the same time interval Y(Y=the length of N/M radio frames) within one scheduling period. N is any one of 32, 64, 128, 256, 512 or 1024, and preferably, N may be 64; and M is any one of 8, 16, 32, 64 or 128, and preferably, M may be 16.

Figure 10:
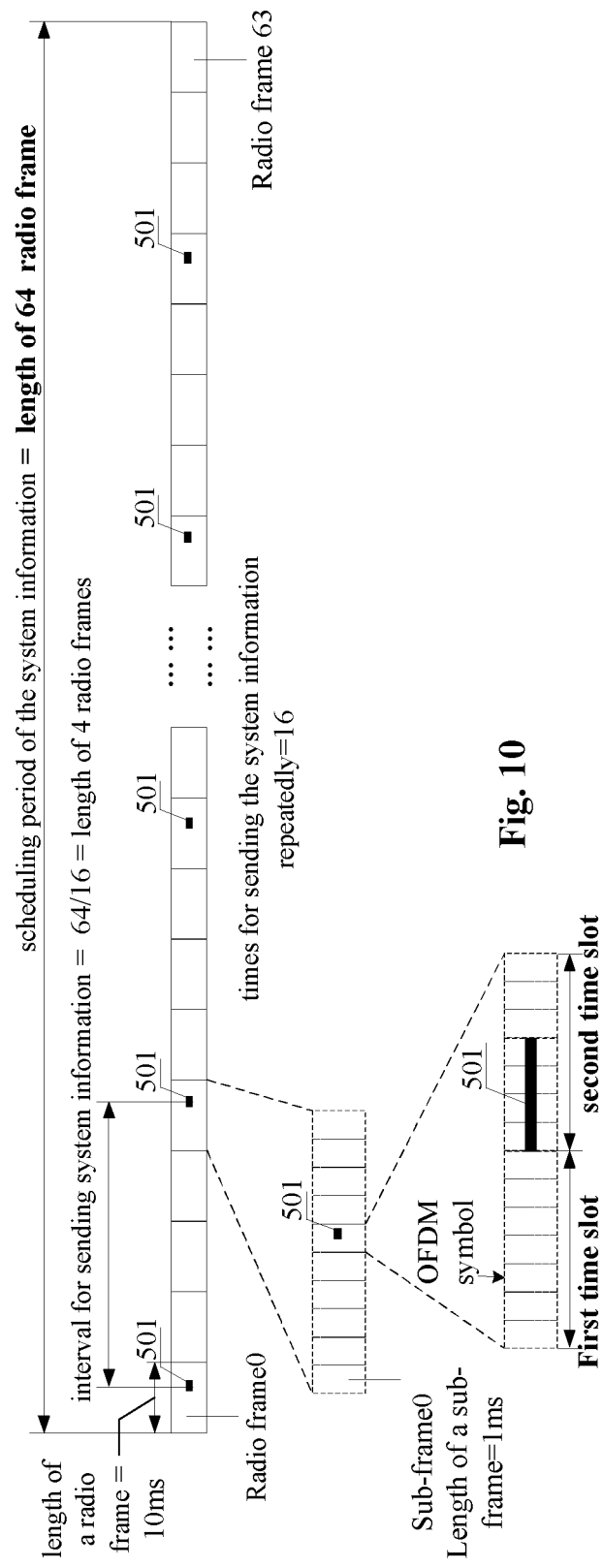
FIG. 10 is a schematic diagram showing pre-defined positions of resources for sending system information according to a first preferred embodiment of the disclosure.

The pre-defined resources for sending the system information are on a radio frame that (the system frame number % Y)=0. As shown in FIG. 10, the scheduling period of the system information is the length of N=64 radio frames, there are M=16 pre-defined resources for sending the system information within one scheduling period of the system information, and the time interval of pre-defined resources for sending the system information 501 is the length of Y=4 radio frames in the figure. On the 64 radio frames shown in FIG. 10, the pre-defined resources for sending the system information 501 are located on radio frames with frame numbers being 0, 4, 8, . . . 56 and 60. The pre-defined resources for sending the system information 501 occupies 4 symbols on a time domain (located on the 1st, 2nd, 3rd and 4th symbols of the second time slot of a sub-frame 5), and occupies 72 sub-carriers on a frequency domain, which preferably can be the 72 sub-carriers occupied the centre.

Step S904: within the same scheduling period of the system information, repeatedly sending, by the NodeB, the same system information on the M=16 pre-defined resources for sending the system information.

Figure 11:
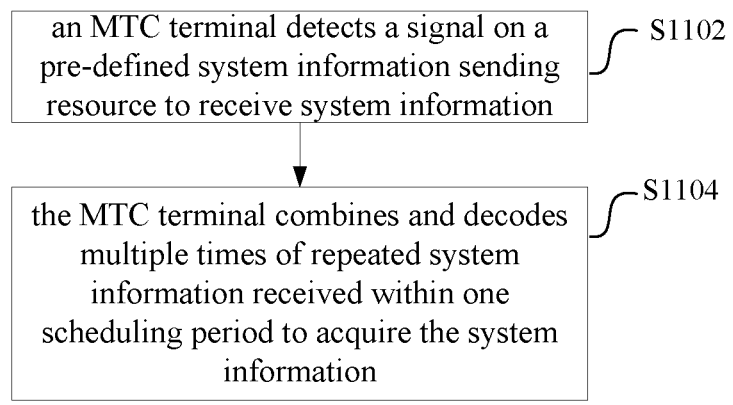
FIG. 11 is a preferred flowchart of a processing on a terminal side in a method for sending control information according to an embodiment of the disclosure.

Processing steps on the terminal side are as shown in FIG. 11, which comprise:

Step S1102: detecting, by an MTC terminal, a signal on pre-defined resources for sending the system information to receive system information; and Step S1104: combining and decoding, by the MTC terminal, multiple times of repeated system information received within one scheduling period to acquire the system information.

In the present preferred embodiment, it is ensured that an MTC terminal apparatus in a low-coverage environment is able to correctly receive system information via detection so as to ensure normal communication requirement of the MTC terminal apparatus by means of the method of repeatedly sending system information on the pre-defined resources for sending the system information in the set scheduling period.

Preferred Embodiment 2

In the present preferred embodiment, sending system information via the method for sending control information provided above is taken as an example for detailed illustration.

As shown in FIG. 9, specific processing steps of the NodeB side comprise:

Step S902: scheduling, by a NodeB, system information on pre-defined resources for sending the control information in a scheduling period, wherein the scheduling period of the system information is the length of N radio frames.

In a scheduling period with a length being the length of N radio frames, there are M pre-defined resources for sending the system information; and the M pre-defined resources for sending the system information maintains the same time interval Y(Y=the length of N/M radio frames) within one scheduling period. N is any one of 32, 64, 128, 256, 512 or 1024, and preferably, N may be 64; and M is any one of 8, 16, 32, 64 or 128, and preferably, M may be 16.

Figure 12:
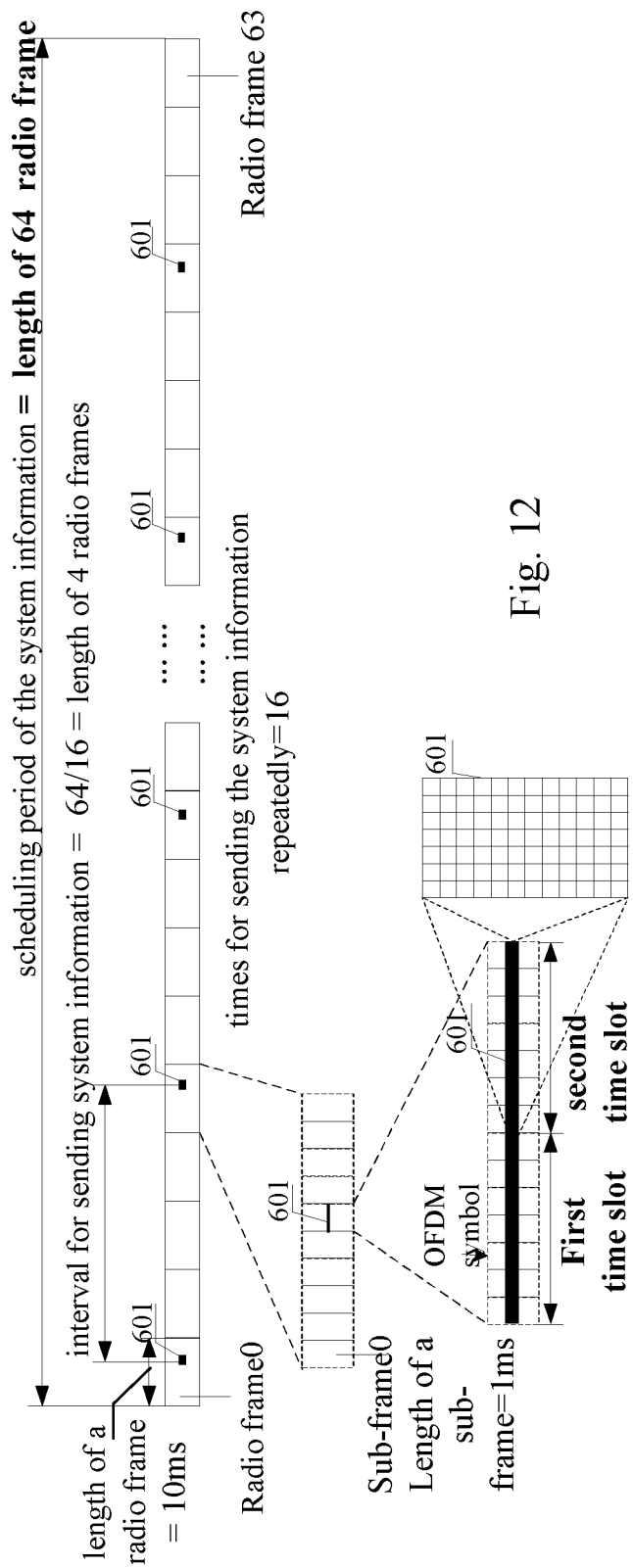
FIG. 12 is a schematic diagram showing pre-defined positions of resources for sending system information according to a second preferred embodiment of the disclosure.

The pre-defined resources for sending the system information are on a radio frame that (the system frame number % Y)=0. As shown in FIG. 12, the scheduling period of the system information is the length of N=64 radio frames, there are M=16 pre-defined resources for sending the system information within one scheduling period of the system information, and the time interval of the pre-defined resources for sending the system information 601 is the length of Y=4 radio frames in the figure. On the 64 radio frames shown in FIG. 12, the pre-defined resources for sending the system information 601 is located on radio frames with frame numbers being 0, 4, 8, . . . 56 and 60. The pre-defined resources for sending the system information 601 occupy 2 resource blocks (referred to as RBs) on the first time slot and the second time slot of a sub-frame 5. Each RB occupies 7 OFDM symbols on a time domain, and occupies 12 sub-carriers on a frequency domain.

Step S904: within the same scheduling period of the system information, repeatedly sending, by the NodeB, the same system information on the M=16 pre-defined resources for sending the system information.

Processing steps on the terminal side are as shown in FIG. 11, which comprise:

Step S1102: detecting, by an MTC terminal, a signal on pre-defined resource for sending the control information to receive control information; and Step S1104: combining and decoding, by the MTC terminal, multiple times of repeated control information received within one scheduling period to acquire the control information.

In the present preferred embodiment, by means of the method of repeatedly sending system information on the pre-defined resources for sending the system information in the set scheduling period, and by allocating the pre-defined resources for sending the system information by means of a resource block, impact on resource allocation of a legacy terminal is further reduced and it is ensured that an MTC terminal apparatus in a low-coverage environment is able to correctly receive system information via detection so as to ensure normal communication requirement of the MTC terminal apparatus.

Preferred Embodiment 3

In the present preferred embodiment, sending paging information via the method for sending control information provided above is taken as an example for detailed illustration. As shown in FIG. 9, specific processing steps of the NodeB side comprise:

Step S902: scheduling, by a NodeB, paging information on the pre-defined resources for sending the paging information in a scheduling period, wherein the scheduling period of the paging information is the length of N radio frames.

In a scheduling period with a length being the length of N radio frames, there are M pre-defined resources for sending the paging information; and the M pre-defined resources for sending the paging information maintains the same time interval Y(Y=the length of N/M radio frames) within one scheduling period. N is any one of 32, 64, 128, 256, 512 or 1024, and preferably, N may be 64; and M is any one of 8, 16, 32, 64 or 128, and preferably, M may be 16.

Figure 13:
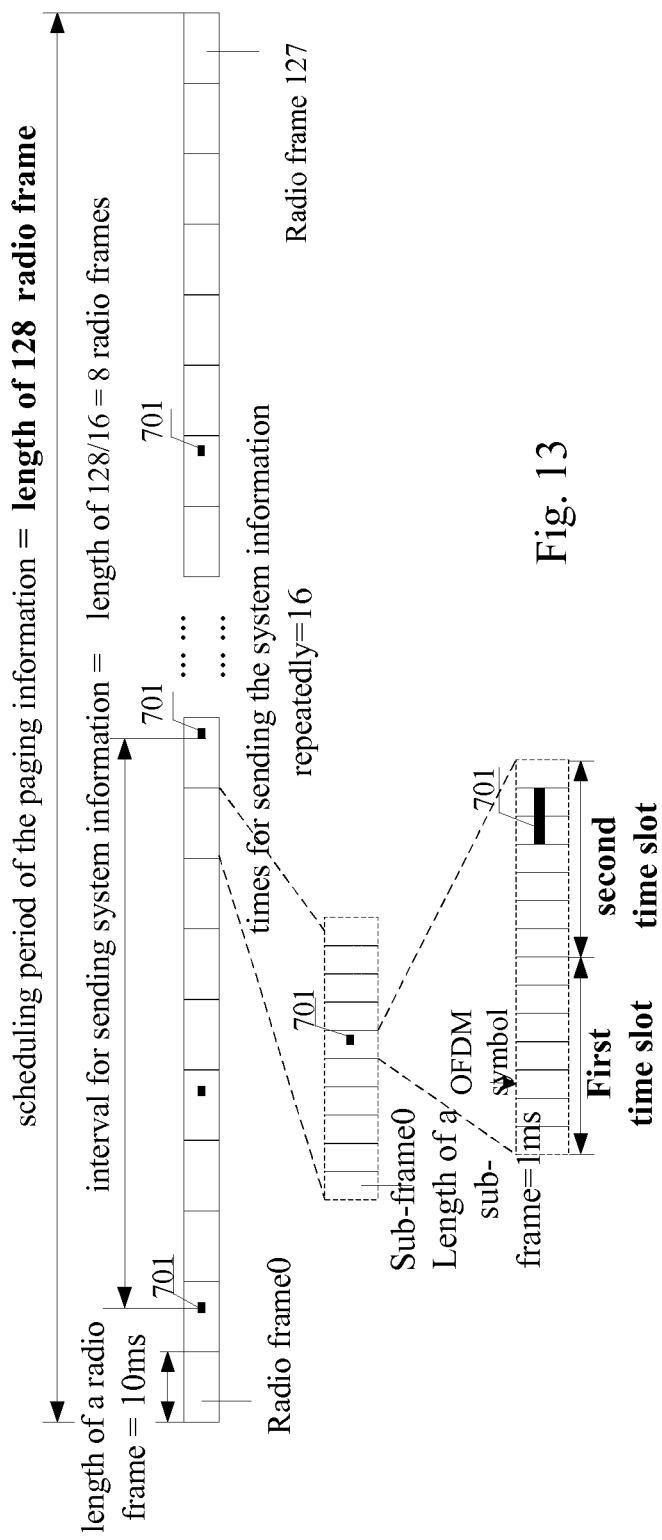
FIG. 13 is a schematic diagram showing pre-defined positions of resources for sending paging information according to a third preferred embodiment of the disclosure.

The pre-defined resources for sending the paging information are on radio frames that (the system frame number % Y)=1. As shown in FIG. 13, the scheduling period of the paging information is the length of N=128 radio frames, there are M=16 pre-defined resources for sending the paging information within one scheduling period of the paging information, and the time interval of the pre-defined resources for sending the paging information 701 is the length of Y=8 radio frames in the figure. On the 128 radio frames shown in FIG. 13, the pre-defined resources for sending the system information 701 is located on radio frames with frame numbers being 1, 9, 17, . . . 113 and 121. The pre-defined resources for sending the paging information 701 occupies 2 symbols on a time domain (located on the 5th and 6th symbols of the second time slot of a sub-frame 5), and occupies 72 sub-carriers on a frequency domain, which preferably can be the 72 sub-carriers occupied the centre.

Step S904: within the same scheduling period of the paging information (a paging period), repeatedly sending, by the NodeB, the same paging information on the M=16 pre-defined resources for sending the paging information.

Processing steps on the terminal side are as shown in FIG. 11, which comprise:

Step S1102: detecting, by an MTC terminal, a signal on the pre-defined resources for sending the paging information to receive paging information; and Step S1104: combining and decoding, by the MTC terminal, multiple times of repeated paging information received within one paging period to acquire the paging information.

In the present preferred embodiment, it is ensured that an MTC terminal apparatus in a low-coverage environment is able to correctly receive paging information via detection so as to ensure maintaining normal communication requirement of the MTC terminal apparatus at an idle state by means of the method of repeatedly sending paging information on the pre-defined resources for sending the paging information in the set paging scheduling period.

Preferred Embodiment 4

In the present preferred embodiment, sending paging information via the method for sending control information provided above is taken as an example for detailed illustration. As shown in FIG. 9, specific processing steps on the NodeB side comprise:

Step S902: scheduling, by a NodeB, paging information on pre-defined resources for sending the paging information in a scheduling period, wherein the scheduling period of the paging information is the length of N radio frames.

In a scheduling period with a length being the length of N radio frames, there are M pre-defined resources for sending the paging information; and the M pre-defined resources for sending the paging information maintains the same time interval Y(Y=the length of N/M radio frames) within one scheduling period. N is any one of 32, 64, 128, 256, 512 or 1024, and preferably, N may be 64; and M is any one of 8, 16, 32, 64 or 128, and preferably, M may be 16.

Figure 14:
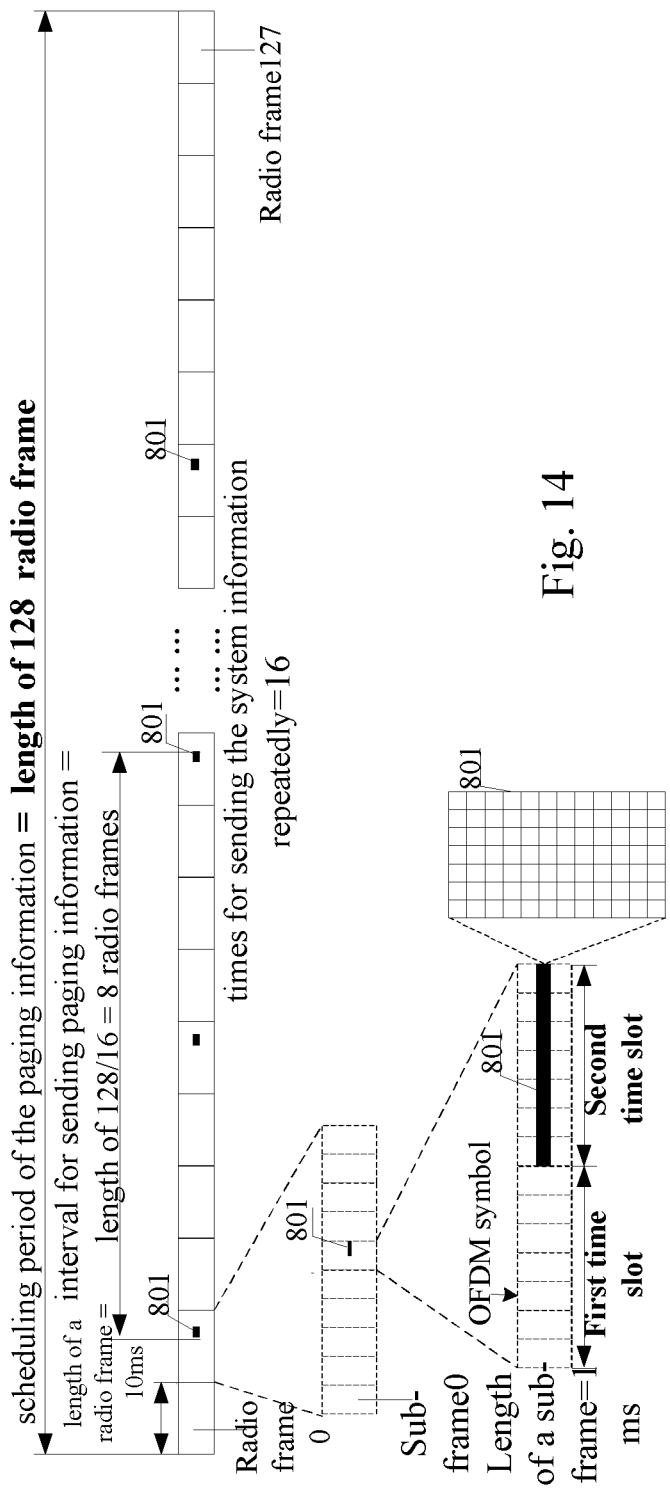
FIG. 14 is a schematic diagram showing pre-defined positions of resources for sending paging information according to a fourth preferred embodiment of the disclosure.

The pre-defined resources for sending the paging information is on the radio frames that (the system frame number % Y)=1. As shown in FIG. 14, the scheduling period of the paging information is the length of N=64 radio frames, there are M=16 pre-defined resources for sending the paging information within one scheduling period of the paging information, and the time interval of the pre-defined resources for sending the paging information 801 is the length of Y=4 radio frames in the figure. On the 64 radio frames shown in FIG. 14, the pre-defined resources for sending the system information 801 are located on radio frames with frame numbers being 1, 5, 9, . . . 57 and 61. The pre-defined resources for sending the paging information 801 occupies 2 resource blocks on the second time slot of a sub-frame 5, and occupies 12 sub-carriers on a frequency domain, wherein each RB occupies 7 OFDM symbols on a time domain.

Step S904: within the same scheduling period of the paging information (a paging period), repeatedly sending, by the NodeB, the same paging information on the M=16 pre-defined resources for sending the paging information.

Processing steps on the terminal side are as shown in FIG. 11, which comprise:

Step S1102: detecting, by an MTC terminal, a signal on pre-defined resource for sending paging information to receive paging information; and Step S1104: combining and decoding, by the MTC terminal, multiple times of repeated paging information received within one paging period to acquire the paging information.

In the present preferred embodiment, by means of the method of repeatedly sending paging information on the pre-defined resources for sending the paging information in the set paging scheduling period, and by allocating the pre-defined resources for sending the paging information by means of resource blocks, impact on resource allocation of a legacy terminal is further reduced and it is ensured that an MTC terminal in a low-coverage environment is able to correctly receive paging information via detection so as to ensure maintaining normal communication requirement of the MTC terminal at an idle state.

Preferred Embodiment 5

Figure 15:
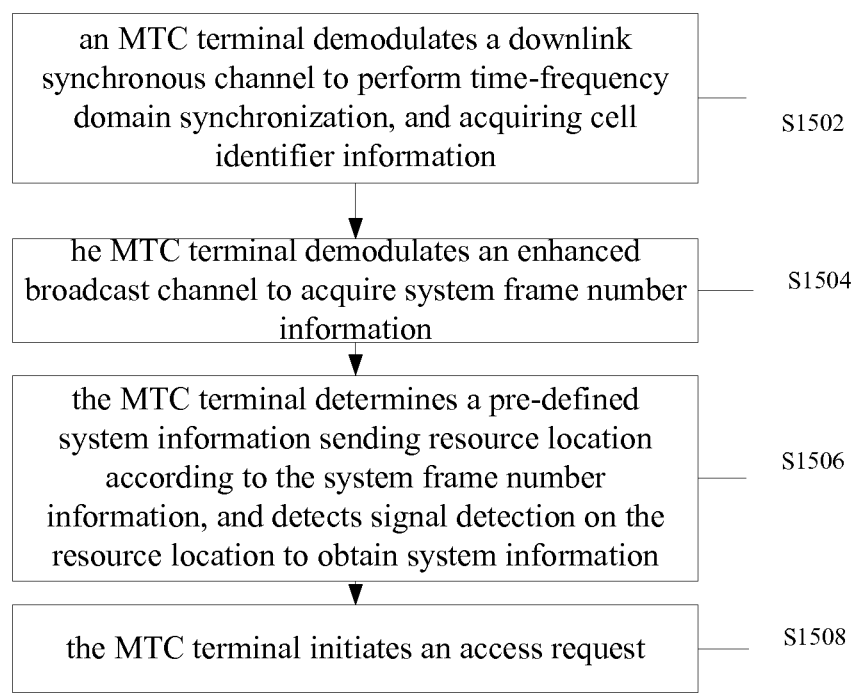
FIG. 15 is a flowchart showing that an MTC terminal accesses a network in a method for sending control information according to a fifth preferred embodiment of the disclosure.

In the present preferred embodiment, by means of the method for sending control information provided above, a process of an MTC terminal accessing a network is described in detail, and as shown in FIG. 15, the process comprises the following steps:

Step S1502: demodulating, by an MTC terminal, a downlink synchronous channel to perform time-frequency domain synchronization, and acquiring cell identifier information;

Step S1504: demodulating, by the MTC terminal, an enhanced broadcast channel to acquire system frame number information;

Step S1506: determining, by the MTC terminal, pre-defined resources for sending the system information according to the system frame number information, and detecting signal detection on the resource location to obtain system information; and Step S1508: initiating, by the MTC terminal, an access request.

In another embodiment, a kind of software is further provided, and the software is used for implementing the technical solution provided in the above-mentioned embodiment and the preferred implementation.

In another embodiment, a storage medium is further provided, the storage medium stores the above-mentioned software, and the storage medium comprises but is not limited to: an optical disk, a floppy disk, a hard disk, and an erasable memory, and the like.

From description above, it can be seen that the disclosure achieves the following technical effects: since a terminal deployed in a low-coverage environment is not sensitive to a time delay, and can tolerate a greater access delay and data transmission time delay, repeated sending times of a control message are ensured by prolonging the length of a scheduling period so as to solve the technical problem in the related art that control information cannot be correctly received in a low-coverage environment and thus a terminal cannot normally access a network, achieving the technical effect of accurately receiving the control information so as to ensure that the network can be accessed normally.

Apparently, those skilled in the art shall understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. In this way, the disclosure is not restricted to any particular hardware and software combination.

The above description is only preferred embodiments of the disclosure and is not intended to limit the disclosure, and the disclosure can have a variety of changes and modifications for those skilled in the art. Any modification, equivalent replacement, or improvement made within the spirit and principle of the disclosure shall all fall within the protection scope of the disclosure.

INDUSTRIAL APPLICABILITY

As described above, the method and device for sending control information and receiving control information provided in the embodiments of the disclosure has the beneficial effects as follows: Since a terminal deployed in a low-coverage environment is not sensitive to a time delay, and can tolerate a greater access delay and data transmission time delay, repeated sending times of a control message are ensured by prolonging the length of a scheduling period so as to solve the technical problem in the related art that control information cannot be correctly received in a low-coverage environment and thus a terminal cannot normally access a network, achieving the technical effect of accurately receiving the control information so as to ensure that the network can be accessed normally.

What is claimed:

1. A method for sending control information to ensure that a network is accessed by a terminal, comprising:
   repeatedly sending, by a first node to the terminal deployed in a low-coverage environment, the control information within a scheduling period for the control information M times,
   wherein the scheduling period is a length of N radio frames, N and M are positive integers greater than 1, and N is greater than or equal to M,
   wherein repeatedly sending the control information M times comprises:
      in the length of N radio frames, sending the control information once on pre-defined resources for sending the control information at a pre-set time interval, or
   equally dividing the length of N radio frames into M periods, and sending the control information once on the pre-defined resources for sending the control information in each of M periods;
   wherein a system frame number of a radio frame where the pre-defined resources for sending the control information are located is determined by the terminal according to at least one of the followings: a pre-set time interval, a cell identifier and indication signaling;
   wherein based on that the system frame number of the radio frame meets a pre-defined condition, the system frame number is the determined system frame number of the radio frame where the pre-defined resources for sending the control information are located, wherein the pre-defined condition comprises one of the followings:
   the system frame number % Y=D;
   (the system frame number+the cell identifier) % Y=D;
   (the system frame number+X) % Y=D; and
   (the system frame number+X+the cell identifier) % Y=D,
      where % indicates a modulo operation, the pre-set time interval is a length of Y radio frames, wherein Y=N/M, and X is a positive integer determined according to the indication signaling, and D is a natural number pre-defined or determined according to the cell identifier; and causing the terminal to initiate an access request comprising the control information to access the network.

2. The method according to claim 1, wherein the N is nth power of 2, the M is mth power of 2, wherein n is a positive integer greater than or equal to 5, and m is a positive integer greater than or equal to 3.

3. The method according to claim 1, wherein a system frame number h of, in the N radio frames, the control information being transmitted in the N radio frames for the kth time is determined according to one of the following formulas:

$$h = \left\lceil \frac{k \times N}{M} \right\rceil \% N$$

$$h = \left( \left\lceil \frac{k \times N}{M} \right\rceil + T \right) \% N$$

where k is a positive integer less than or equal to M, h is a positive integer less than or equal to N, % indicates a modulo operation, ⌈⌉ indicates a round-up operation, and T is at least one of the followings: a pre-defined value, a cell identifier and a signalling indication value.

4. The method according to claim 1, wherein the control information comprises: system information and/or paging information.

5. The method according to claim 4, wherein based on that the control information is the system information, in a Frequency Division Duplex (FDD) system, the system information comprises at least one of the followings: access channel configuration information, uplink bandwidth information and uplink carrier frequency information; and in a Time Division Duplex (TDD) system, the system information comprises at least one of the followings: access channel configuration information, uplink bandwidth information and uplink to downlink ratio information.

6. The method according to claim 4, wherein pre-defined resources for sending the control information corresponding to the system information and pre-defined resources for sending the control information corresponding to the paging information are located in different radio frames, or the pre-defined resources for sending the control information corresponding to the system information and the pre-defined resources for sending the control information corresponding to the paging information are located in different sub-frames in the same radio frame.

7. The method according to claim 6, wherein based on that the pre-defined resources for sending the control information corresponding to the system information and the pre-defined resources for sending the control information corresponding to the paging information are located in different sub-frames in the same radio frame, the system information and/or the paging information is sent on at least one of the following sub-frames: a sub-frame with a sub-frame number being 5, a sub-frame with a sub-frame number being 6, a sub-frame with a sub-frame number being 7, a sub-frame with a sub-frame number being 8 and a sub-frame with a sub-frame number being 9.

8. The method according to claim 1, wherein the pre-defined resources for sending the control information occupies Q Orthogonal Frequency Division Multiplexing (OFDM) symbols on a time domain and occupies S sub-carriers on a frequency domain, or the pre-defined resources for sending the control information occupies P resource blocks, wherein Q, S and P are positive integers.

9. The method according to claim 8, wherein Q is any one of 2, 3 and 4, and S is 36 or 72.

10. A method for receiving control information to ensure that a network is accessed by a terminal, comprising:
a terminal repeatedly receiving signal, from a first node, which carries control information M times within a scheduling period, wherein a length of the scheduling period is N radio frames, N and M are positive integers greater than 1, and N is greater than or equal to M,
the terminal combining and decoding the received M times of the signal to determine the control information,
wherein the terminal repeatedly receiving the signal which carries control information M times within the scheduling period the length of which is N radio frames comprises: the terminal determining a system frame number of a radio frame where pre-defined resources for sending the control information are located, wherein there are M pre-defined resources for sending the control information in the scheduling period; and the terminal detecting the signal on the radio frame corresponding to the determined system frame number to acquire the control information,
wherein the terminal determining the system frame number of the radio frame where the control information is located comprises: the terminal determining the system frame number of the radio frame where the control information is located according to at least one of the followings: a pre-set time interval, a cell identifier and indication signalling, wherein the cell identifier is acquired by way of the terminal demodulating a downlink synchronous channel;
wherein based on that the system frame number of the radio frame meets a pre-defined condition, the system frame number is the determined system frame number of the radio frame where the pre-defined resources for sending the control information are located, wherein the pre-defined condition comprises one of the followings:
the system frame number % Y=D;
(the system frame number+the cell identifier) % Y=D;
(the system frame number+X) % Y=D; and
(the system frame number+X+the cell identifier) % Y=D,
where % indicates a modulo operation, the pre-set time interval is a length of Y radio frames, wherein Y=N/M, and X is a positive integer determined according to indication signaling, and D is a natural number pre-defined or determined according to the cell identifier; and
the terminal initiating an access request comprising the control information to access the network.

11. The method according to claim 10, wherein locations of the pre-defined resources for sending the control information are fixed, and sizes of the pre-defined resources for sending the control information are determined according to a size of a resource required by maximum control information.

12. The method according to claim 10, wherein a corresponding system frame number h of, in the N radio frames, the control information being transmitted in the N radio frames for the kth time is determined according to one of the following formulas:

$$h = \left\lceil \frac{k \times N}{M} \right\rceil \% N$$

-continued $$h = \left(\left\lceil \frac{k \times N}{M} \right\rceil + T\right) \% N$$

where k is a positive integer less than or equal to M, h is a positive integer less than or equal to N, % indicates a modulo operation, ⌈⌉ indicates a round-up operation, and T is at least one of the followings: a pre-defined value, a cell identifier and a signalling indication value.

13. A device for sending control information, the device comprising:
- a sending circuitry configured to repeatedly send the control information within a scheduling period for the control information M times, wherein the scheduling period is a length of N radio frames, N and M are positive integers greater than 1, and N is greater than or equal to M;
- wherein the sending circuitry is configured to repeatedly send the control information within a scheduling period for the control information M times through following steps: in the length of N radio frames, sending the control information once on pre-defined resources for sending the control information at a pre-set time interval; or equally dividing the length of N radio frames into M periods, and sending the control information once on the pre-defined resources for sending the control information in each of M periods;
- wherein a system frame number of a radio frame where the pre-defined resources for sending the control information are located is determined according to at least one of the followings: a pre-set time interval, a cell identifier and indication signaling;
- wherein based on that the system frame number of the radio frame meets a pre-defined condition, the system frame number is the determined system frame number of the radio frame where the pre-defined resources for sending the control information are located, wherein the pre-defined condition comprises one of the followings:
- the system frame number % Y=D;
- (the system frame number+the cell identifier) % Y=D;
- (the system frame number+X) % Y=D; and
- (the system frame number+X+the cell identifier) % Y=D, where % indicates a modulo operation, the pre-set time interval is a length of Y radio frames, wherein Y=N/M, and X is a positive integer determined according to the indication signaling, and D is a natural number pre-defined or determined according to the cell identifier,
- wherein the device initiates an access request comprising the control information to access the network.

14. A device for receiving control information, the device comprising:
- a receiving circuitry configured to repeatedly receive, from a first node, signal which carries control information M times within a scheduling period which is a length of N radio frames, wherein N and M are positive integers greater than 1, and N is greater than or equal to M; and
- a decoding circuitry configured to combine and decode the received M times of the signal to determine the control information;
- wherein the receiving circuitry is configured to repeatedly receive the signal which carries the control information M times within the scheduling period which is the length of N radio frames through following steps: the terminal determining a system frame number of a radio frame where pre-defined resources for sending the control information are located, wherein there are M pre-defined resources for sending the control information in the scheduling period; and the terminal detecting a signal on the radio frame corresponding to the determined system frame number to acquire the control information;
- wherein the terminal determining the system frame number of the radio frame where the control information is located comprises: the terminal determining the system frame number of the radio frame where the control information is located according to at least one of the followings: a pre-set time interval, a cell identifier and indication signaling, wherein the cell identifier is acquired by way of the terminal demodulating a downlink synchronous channel;
- wherein based on that the system frame number of the radio frame meets a pre-defined condition, the system frame number is the determined system frame number of the radio frame where the pre-defined resources for sending the control information are located, wherein the pre-defined condition comprises one of the followings:
- the system frame number % Y=D;
- (the system frame number+the cell identifier) % Y=D;
- (the system frame number+X) % Y=D; and
- (the system frame number+X+the cell identifier) % Y=D, where % indicates a modulo operation, the pre-set time interval is a length of Y radio frames, wherein Y=N/M, and X is a positive integer determined according to indication signaling, and D is a natural number pre-defined or determined according to the cell identifier,
- wherein the device initiates an access request comprising the control information to access the network.

* * * * *